US011710711B2

(12) United States Patent
Marzaki et al.

(10) Patent No.: US 11,710,711 B2
(45) Date of Patent: Jul. 25, 2023

(54) INTEGRATED CIRCUIT PROVIDED WITH DECOYS AGAINST REVERSE ENGINEERING AND CORRESPONDING FABRICATION PROCESS

(71) Applicant: STMicroelectronics (Rousset) SAS, Rousset (FR)

(72) Inventors: Abderrezak Marzaki, Aix en Provence (FR); Mathieu Lisart, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 49 days.

(21) Appl. No.: 17/351,930

(22) Filed: Jun. 18, 2021

(65) Prior Publication Data
US 2021/0313280 A1 Oct. 7, 2021

Related U.S. Application Data

(62) Division of application No. 16/292,958, filed on Mar. 5, 2019, now Pat. No. 11,069,628.

(30) Foreign Application Priority Data

Mar. 7, 2018 (FR) ...................................... 1851957

(51) Int. Cl.
*H01L 23/00* (2006.01)
*G06F 21/87* (2013.01)
(Continued)

(52) U.S. Cl.
CPC ............ *H01L 23/576* (2013.01); *G06F 21/75* (2013.01); *G06F 21/87* (2013.01); *H01L 23/57* (2013.01);
(Continued)

(58) Field of Classification Search
None
See application file for complete search history.

(56) References Cited

U.S. PATENT DOCUMENTS 5,814,850 A * 9/1998 Iwasa ................ H01L 27/11526
257/296
7,057,230 B2 6/2006 Tanaka et al.
(Continued)

FOREIGN PATENT DOCUMENTS

FR 2858113 A1 1/2005

OTHER PUBLICATIONS

INPI Search Report and Written Opinion for FR 1851957 dated Nov. 9, 2018 (6 pages).

*Primary Examiner* — Hung K Vu
(74) *Attorney, Agent, or Firm* — Crowe & Dunlevy

(57) ABSTRACT

An integrated circuit includes a first domain supplied with power at a first supply voltage. A first transistor comprising in the first domain includes a first gate region and a first gate dielectric region. A second domain is supply with power at a second supply voltage and includes a second transistor having a second gate region and a second gate dielectric region, the second gate region being biased at a voltage that is higher than the first supply voltage. The first and second gate dielectric regions have the same composition, wherein that composition configures the first transistor in a permanently turned off condition in response to a gate bias voltage lower than or equal to the first supply voltage. The second transistor is a floating gate memory cell transistor, with the second gate dielectric region located between the floating and control gates.

13 Claims, 10 Drawing Sheets

(51) Int. Cl.
*H04N 19/44* (2014.01)
*H01L 27/02* (2006.01)
*G06F 21/75* (2013.01)

(52) U.S. Cl.
CPC ......... *H01L 27/0207* (2013.01); *H04N 19/44* (2014.11)

(56) References Cited

U.S. PATENT DOCUMENTS

| | | | |
|---|---|---|---|
| 7,128,271 B2* | 10/2006 | Kim | H01L 27/0207 257/E27.009 |
| 7,863,670 B2* | 1/2011 | Ishii | H01L 27/105 257/315 |
| 2005/0017752 A1 | 1/2005 | Kim | |
| 2015/0031197 A1 | 1/2015 | Chang et al. | |

* cited by examiner ical field

INTEGRATED CIRCUIT PROVIDED WITH DECOYS AGAINST REVERSE ENGINEERING AND CORRESPONDING FABRICATION PROCESS

CROSS REFERENCE TO RELATED APPLICATIONS

This application is a divisional of U.S. patent application Ser. No. 16/292,958 filed Mar. 5, 2019, which claims the priority benefit of French Application for Patent No. 1851957, filed on Mar. 7, 2018, the contents of which are hereby incorporated by reference in their entireties to the maximum extent allowable by law.

TECHNICAL FIELD

Embodiments and modes of implementation relate to integrated circuits, in particular integrated circuits provided with means for combating reverse engineering.

BACKGROUND

The architectures of integrated-circuit component assemblies are mainly derived from the fabrication know-how and secrets of the integrated-circuit designers.

However, modern microscopic observation techniques, such as scanning or transmission electron microscopy, make it possible for integrated-circuit component assemblies to be observed and their architectures to be deduced therefrom.

It is therefore desirable to make provision for means which would prevent such observations from being made, in particular to guard against potential reverse engineering.

SUMMARY

According to one aspect, provision is made for an integrated circuit comprising a first domain intended to be supplied with power by a first supply voltage and including at least one first transistor comprising a first gate region and a first gate dielectric region, and a second domain including at least one second transistor comprising a second gate region intended to be biased at a second voltage that is higher than the first supply voltage and a second gate dielectric region, wherein said first and second gate dielectric regions have the same composition and are configured such that said at least one first transistor is turned off for any biasing of said first gate region at a value that is lower than or equal to the first supply voltage.

The term "supply voltage" is understood to mean the supply voltage at its nominal value and the variations in the supply voltage with respect to this nominal value, for example due to temperature, which may result in an actual value of the supply voltage that is higher than said nominal value. In other words, the term "supply voltage" is understood to mean the actual maximum value of the supply voltage specified for the first domain of the integrated circuit.

However, the expression "biasing a gate region of a transistor" is understood to refer to the absolute voltage value between the gate region and a source region of the transistor. The production of such transistors configured always to be in an off state makes it possible in particular to deceive an observer seeking to reconstruct the function of the architecture of a portion of the integrated circuit, and thus to guard against reverse engineering.

According to one embodiment, in which the first supply voltage is comprised between 1.0 and 2.0 volts, the thickness of said gate dielectric regions is greater than 4 nm, preferably at least equal to 10 nm.

According to one embodiment, said gate dielectric regions include a stack of silicon oxide-nitride-oxide layers.

Specifically, a stack of layers of silicon oxide, silicon nitride and silicon oxide advantageously allows the first transistor always to be placed in an off state, in the first domain of the integrated circuit, such as, for example, a domain for which the supply voltage is equal to 2 volts or less.

According to one embodiment, the first domain includes at least one third transistor having a third gate region and being functionally operational for any biasing of the third gate region at a value that is lower than or equal to the first supply voltage, electrically coupled together with said at least one first transistor according to form a circuit configured to implement one logic function, but arranged according to an arrangement that would correspond to another logic function if all of the transistors of this assembly were third transistors.

This advantageously allows the effect of the decoy to be increased. Specifically, an observer, seeking, for example, to reconstruct the architecture of a portion of the integrated circuit, is misled by such an arrangement by recognizing there a conventional structure for a logic function other than that for which the assembly of the first (off) transistor and the third (operational) transistor is configured.

According to one embodiment, said at least one first transistor comprises gate spacers on the flanks of said first gate region, and the first gate dielectric region of said at least one first transistor is self-aligned with said gate spacers.

Self-alignment is, on the one hand, an advantage in itself in integrated circuit technologies. On the other hand, seen from above, there is strictly no overrun of the gate dielectric region with respect to the structure of the first gate region and the spacers on its flanks. Thus, it is impossible, or at least very difficult, to observe that the first transistor includes a gate dielectric region configured to place it permanently in an off state.

According to one embodiment, the first domain contains at least one circuit configured to implement a logic function, and the second domain contains at least one circuit intended to store data.

In addition, for example, the first and third transistors are logic-circuit CMOS transistors (apart from the gate dielectric region of the first transistors) and, for example, the second transistors are floating-gate transistors.

Thus, said at least one second transistor may comprise a floating gate and a control gate forming said second gate region, and said second gate dielectric region may be located between the floating gate and the control gate.

Provision is also made for an electronic device, such as a personal computer or a television decoder, comprising an integrated circuit such as defined above.

According to another aspect, provision is made for a process for fabricating an integrated circuit, comprising:
   fabricating, in a first domain intended to be supplied with power by a first supply voltage, at least one first transistor comprising an operation of forming a first gate dielectric region and an operation of forming a first gate region on said first gate dielectric region;
   fabricating, in a second domain, at least one second transistor comprising an operation of forming a second gate dielectric region and an operation of forming a second gate region on said first gate dielectric region which is intended to be biased at a second voltage that is higher than the first supply voltage;

According to a general feature of this aspect, the operation of forming the first gate dielectric region is analogous to and simultaneous with the operation of forming the second gate dielectric region, and said operations of forming the gate dielectric regions are configured such that said at least one first transistor is turned off for any biasing of said first gate region at a value that is lower than or equal to the first supply voltage.

According to one mode of implementation wherein the first supply voltage being comprised between 1.0 and 2.0 volts, said operations of forming the gate dielectric regions are configured such that the thickness of said gate dielectric regions is greater than 4 nm, preferably at least equal to 10 nm.

According to one mode of implementation, said operation of forming the first and second gate dielectric regions comprises an operation of forming a stack of silicon oxide-nitride-oxide layers.

According to one mode of implementation, the fabrication of said at least one first transistor comprises an operation of forming gate spacers on the flanks of said first gate region, comprising an operation of isotropic depositing and an operation of anisotropically etching a spacer dielectric material, and said anisotropic etching operation is configured also to remove the portion of the first gate dielectric region covered neither by a spacer nor by the first gate region.

According to one mode of implementation, the fabrication of said at least one second transistor comprises an operation of forming a floating gate and an operation of forming a control gate forming the second gate region, said second gate dielectric region being formed between the floating gate and the control gate.

Thus, an integrated circuit according to one embodiment defined above may have been fabricated via a process according to one of the modes of implementation defined above.

BRIEF DESCRIPTION OF THE DRAWINGS

Other advantages and features of the invention will become apparent on examining the detailed description of wholly non-limiting modes of implementation and embodiments and the appended drawings, in which.

DETAILED DESCRIPTION OF THE DRAWINGS

The numbering of the figures from 1 to 9 corresponds to fabrication steps carried out starting with a semiconductor substrate, such as a crystalline silicon wafer.

The lettering of the figures as A, B and C corresponds to different portions of different domains LVP, HVP of the semiconductor substrate on the basis of which said fabrication steps are carried out.

The figures referenced A show one portion of a first domain LVP, supplied with power by a first voltage LVdd, which is intended to include a third transistor NT or PT (in this example, an operational logic transistor). The figures referenced B show another portion of the first domain LVP, intended to include a first transistor NTb or PTb (in this example, an off transistor). The figures referenced C show one portion of a second domain HVP, receiving or generating a second voltage HVdd that is higher than the first supply voltage LVdd, which is intended to include a second transistor FGT (in this example, a floating-gate transistor). The three portions corresponding to the respective figures will be referred to hereinafter as portion A, portion B and portion C.

Figure 1A:
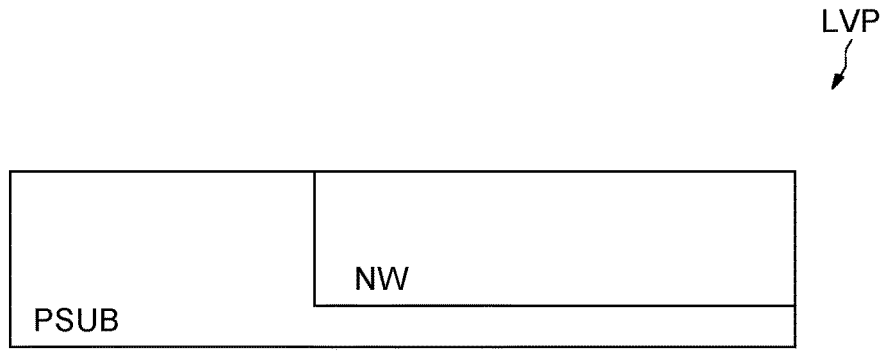
FIGS. 1A-1C to 9A-9C schematically illustrate results of steps of fabricating an integrated circuit according to one exemplary mode of implementation.
Figure 1B:
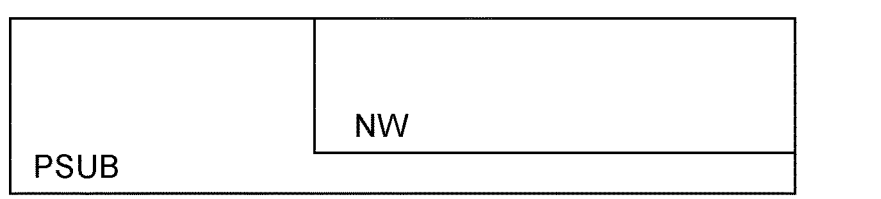
Figure 1C:
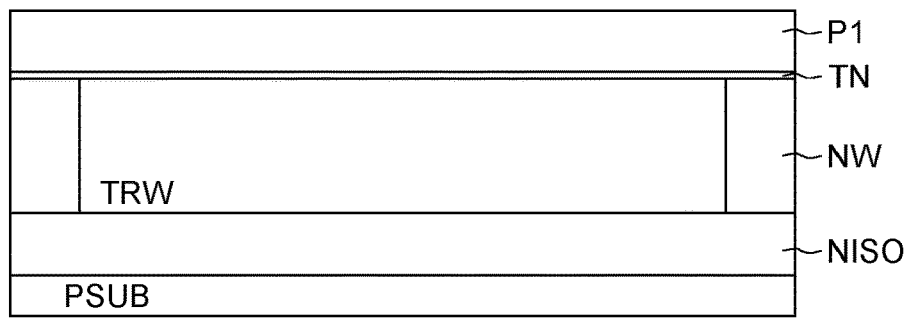

FIGS. 1A, 1B and 1C show preliminary structures on which steps common to the three portions A, B and C will be implemented.

The structures of the first domain LVP, shown by FIGS. 1A and 1B, include a single well NW of a second conductivity type (here n-type conductivity) formed in the semiconductor substrate PSUB of a first conductivity type (here p-type conductivity).

The structure of the second domain HVP, shown by FIG. 1C, includes an arrangement in the "triple-well" substrate allowing a well TRW of the first conductivity type to be electrically isolated from the substrate. Typically, the triple-well arrangement includes the well TRW being delimited by isolating regions NW, NISO of the first conductivity type surrounding said well TRW on the sides (NW) and vertically below (NISO).

In this example, in which the second transistor FGT is a floating-gate transistor, this structure is covered by a tunnel dielectric TN, which is itself covered by a first conductive layer P1.

Typically, the tunnel dielectric TN allows hot-carrier injection and/or charge injection/extraction by Fowler-Nordheim effect, in a conventional manner known per se.

The first conductive layer P1 is typically formed of doped polycrystalline silicon, and is intended to form a floating-gate region of the second transistor FGT.

The tunnel dielectric layer TN and the first conductive layer P1 may also have been formed in the first domain LVP of the integrated circuit IC, at the same time as said tunnel dielectric layer TN and said first conductive layer P1 are formed in the second domain HVP, but they are immediately removed so as to obtain the structures shown by FIGS. 1A and 1B.

Figure 2A:
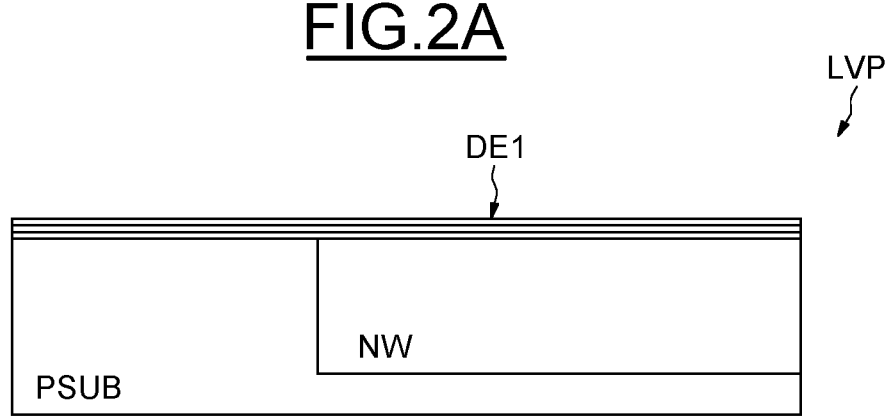
Figure 2B:
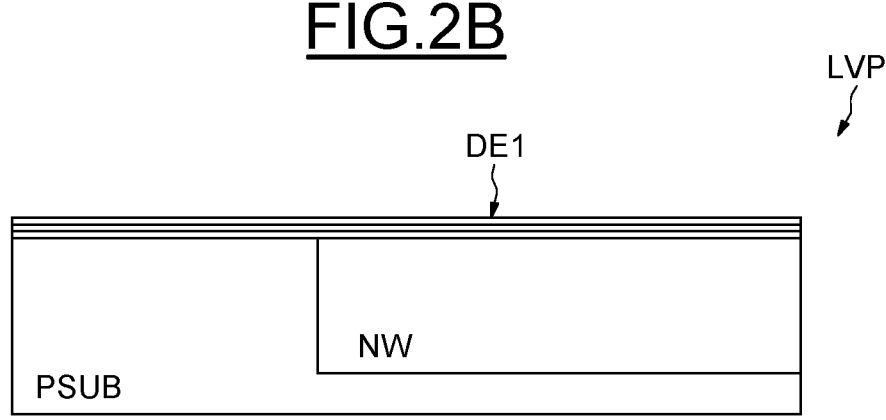

FIGS. 2A and 2B show the result of a step of forming a first gate dielectric region DE1 on the structures described above with reference to FIGS. 1A and 1B in the first domain LVP of the integrated circuit IC.

Figure 2C:
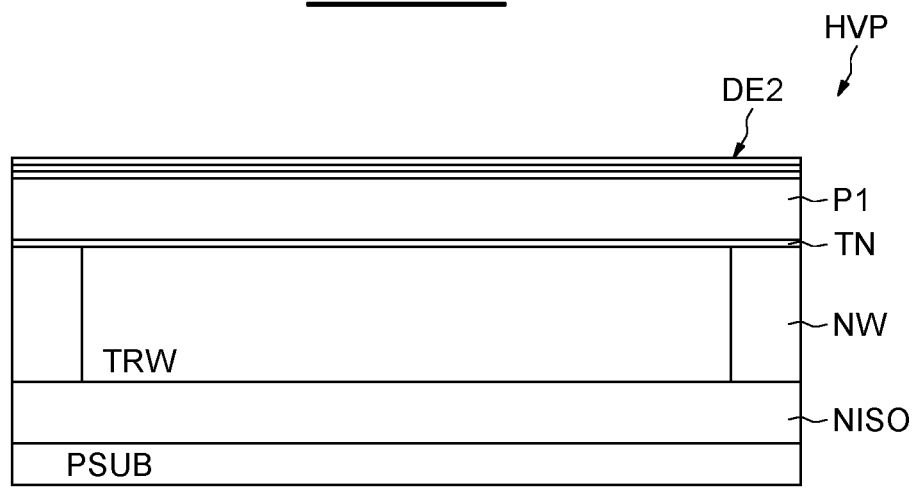

FIG. 2C shows the result of an operation of forming a second gate dielectric region DE2 on the structure described above with reference to FIG. 1C in the second domain HVP of the integrated circuit IC.

The first gate dielectric region DE1 and the second gate dielectric region DE2 are formed in one and the same step and at the same time in the first domain LVP and in the second domain HVP.

In other words, the formation of the first gate dielectric region DE1 is analogous to and simultaneous with the formation of the second gate dielectric region DE2. Consequently, said first and second gate dielectric regions DE1 and DE2 have the same composition.

Moreover, said operations of forming the gate dielectric regions DE1 and DE2 are configured such that said at least one first transistor PTb, NTb is turned off for any biasing of a first gate region GTb (the formation of which will be described below with reference to FIGS. 5B and 6B) at a value that is lower than or equal to the first supply voltage LVdd. The third transistor PT, NT would, on the contrary, be turned on in response to the same biasing of the gate region GT.

In this example, in which the second transistor is a floating-gate transistor, said gate dielectric layer DE2 is configured to meet the requirements of a floating-gate transistor, and is thus typically intended to withstand high voltages of the order of 10 to 15 volts. However, such a configuration may allow the first transistor PTb, NTb to be compulsorily left in the off state for any voltage not exceeding the first supply voltage LVdd.

This is particularly the case with the stacks of silicon oxide-nitride-oxide layers that are conventionally formed between the floating gate and a control gate of a floating-gate transistor.

Thus, the gate dielectric regions DE1 and DE2 may include a stack of silicon oxide-nitride-oxide (ONO) layers.

Figure 3A:
Figure 3B:
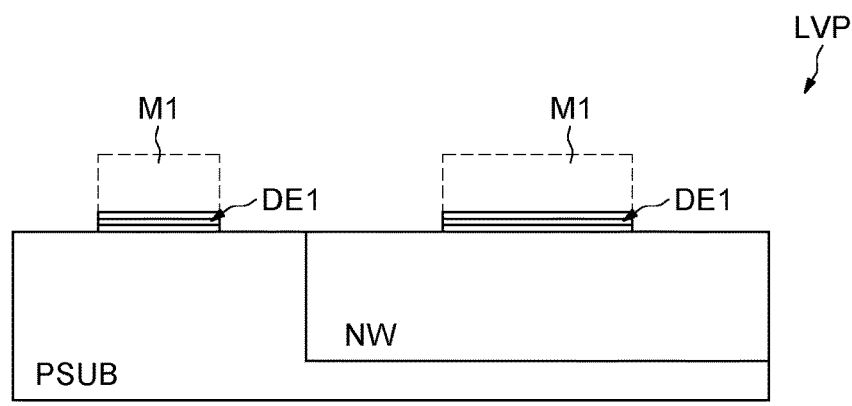
Figure 3C:
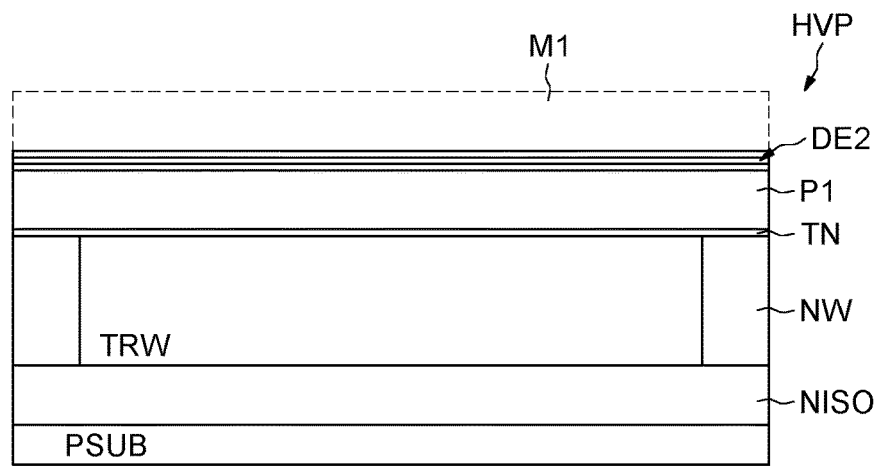

FIGS. 3A, 3B and 3C show the result of a step of etching the gate dielectric regions DE1, DE2 on the structures described above with reference to FIGS. 2A and 2B in the first domain LVP of the integrated circuit IC and on the structure described above with reference to FIG. 2C in the second domain HVP of the integrated circuit IC.

The etching operation, typically a plasma-based dry etching operation, is, for example, carried out on the wafer scale through openings in a mask, resulting in local etching in the first domain LVP, the rest of the substrate being protected by the full portions of the mask.

On the structure of the portion A shown by FIG. 3A, no mask has been formed (or the mask M1, described below, has been formed by lithography so as to be completely open with respect to the portion A) and the previously deposited gate dielectric layer DE1 is completely etched.

On the structure of the portion B shown by FIG. 3B, a mask M1 has been formed by lithography so as to cover and to protect a portion of the first gate dielectric region DE1 located facing a future first gate region GTb of said at least one first transistor PTb, NTb (the formation of which will be described below with reference to FIGS. 5B and 6B).

The formation of the mask M1 by lithography may advantageously be roughly aligned with the position of said future first gate region GTb, since the first gate dielectric region DE1 will be etched again in a subsequent step (described below with reference to FIG. 8B).

On the structure of the portion C shown by FIG. 3C, the mask M1 has been formed by lithography so as to cover and to protect the entire second gate dielectric region DE2 located in the portion C of the second domain HVP of the integrated circuit IC.

The mask M1 is then removed from all parts.

Figure 4A:
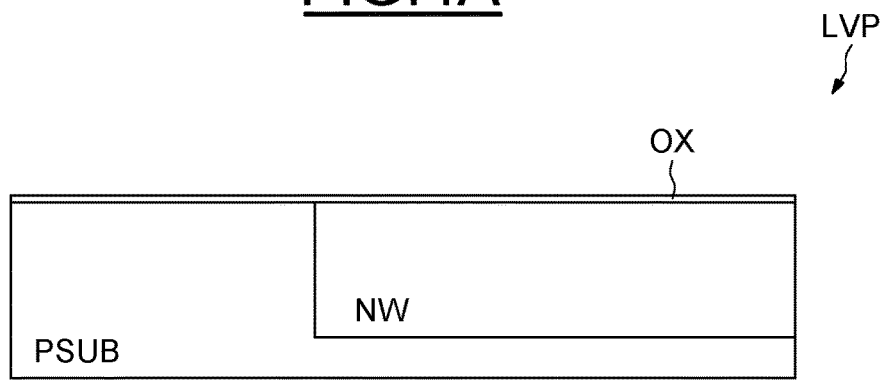
Figure 4B:
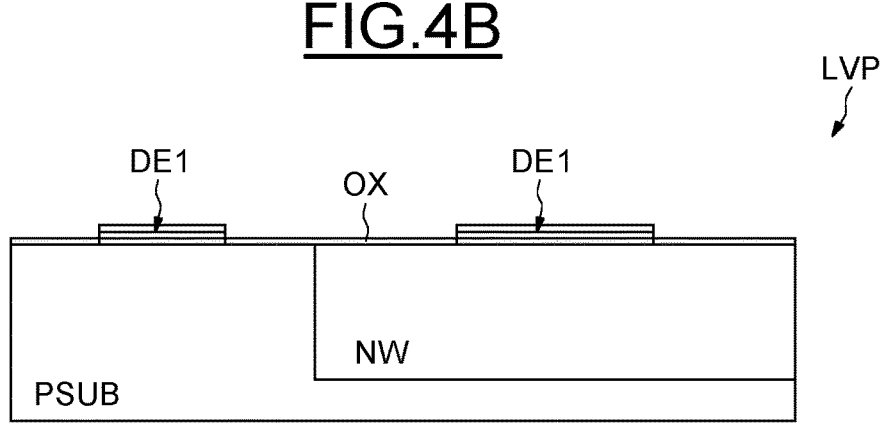
Figure 4C:
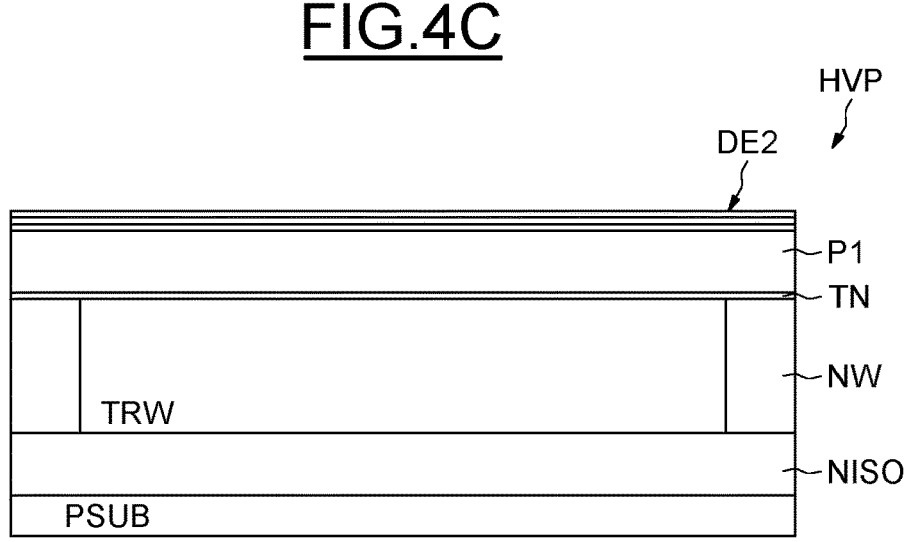

FIGS. 4A, 4B and 4C show the result of growing a gate oxide OX over all of the exposed surfaces of the substrate PSUB and of the wells NW and TRW of the structures described above with reference to FIGS. 3A, 3B and 3C.

The gate oxide OX, intended to form gates of third transistors, in this example CMOS transistors, additionally makes it possible to finish the formation of the upper silicon oxide (top oxide) layer of the silicon oxide-nitride-oxide stack.

Conventionally, another gate oxide may also finish the formation of the top oxide of the ONO stack, but this is not shown here since it adds nothing with respect to the elements formed in the portions A, B and C of this example.

Figure 5A:
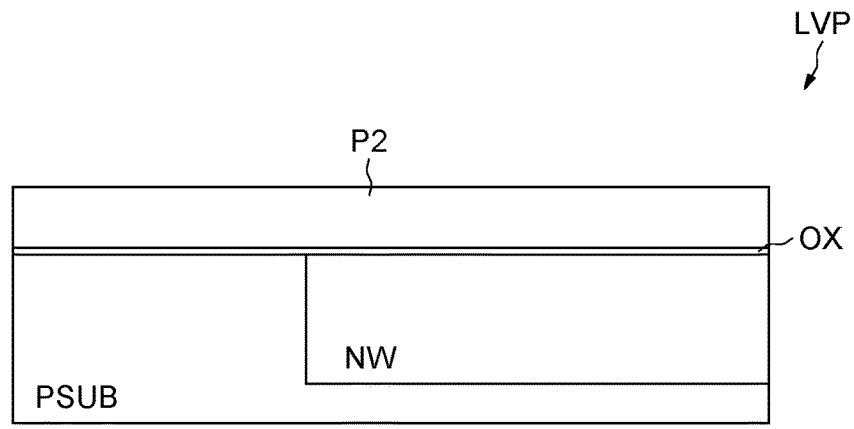
Figure 5B:
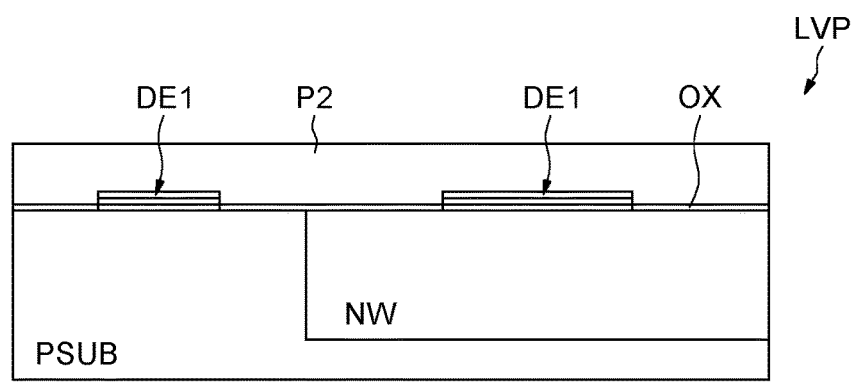
Figure 5C:
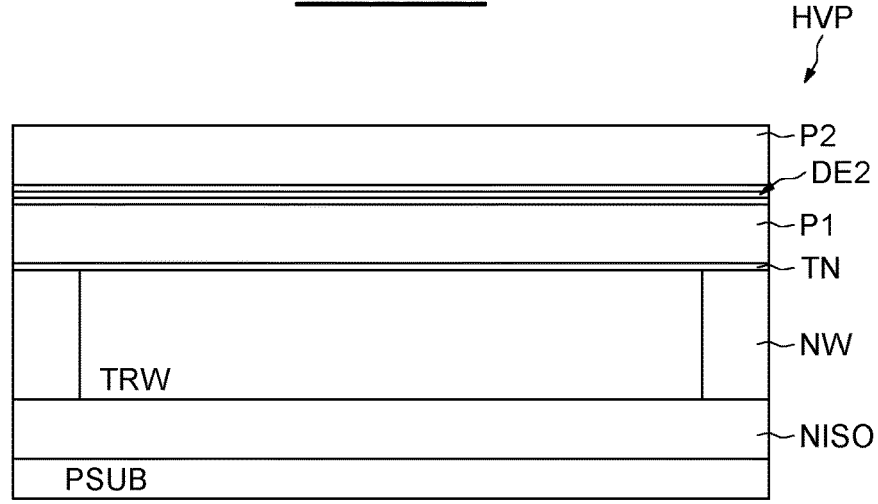

FIGS. 5A, 5B and 5C show the result of an operation of depositing a conductive material P2 on the structures described above with reference to FIGS. 4A, 4B and 4C.

For example, the conductive material P2 is a conductive gate material, such as doped polycrystalline silicon.

The layer of conductive material P2 covers the entire surface of said structures.

Figure 6A:
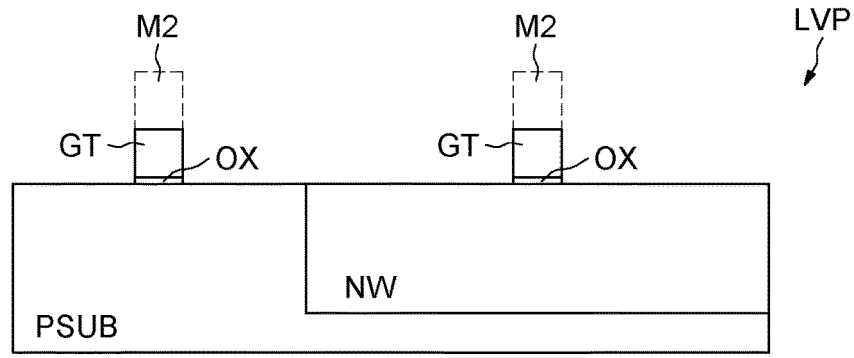
Figure 6B:
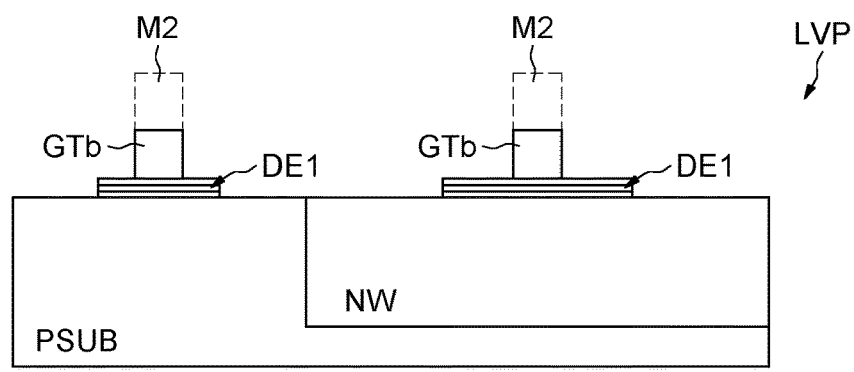

FIGS. 6A and 6B show the result of an operation of etching the conductive material P2 of the structures of the first domain LVP described above with reference to FIGS. 5A and 5B.

The etching operation is, for example, carried out using a plasma-based dry etching technique.

A mask M2 has been formed by lithography so as to cover and to protect the portion of the layer of conductive material P2 that will form a first gate region GTb of said at least one first transistor PTb, NTb in the portion B, as well as the portion of the layer of conductive material P2 that will form a third gate region GT of said at least one third transistor PT, NT in the portion A.

During this etching operation, the mask M2 covers and protects the entire surface of the structure of the portion C described above with reference to FIG. 5C.

Thus, the fabrication of said at least one first transistor PTb, NTb comprises an operation of forming a first gate region GTb on said first gate dielectric region DE1 in the first domain LVP of the integrated circuit IC.

The first gate dielectric region DE1 is, however, not removed in this etching operation, and laterally overruns each side of the first gate region GTb thus formed. This overrun is due to the so-called rough, i.e. inexact, alignment of the positioning of the mask M1 such as described above with reference to FIG. 3B. Of course, if in particular the lithography technique used for forming said mask M1 allows it, the overrun may be negligible. That being said, this type of fabrication process is generally tricky and hence undesirable.

Figure 6C:
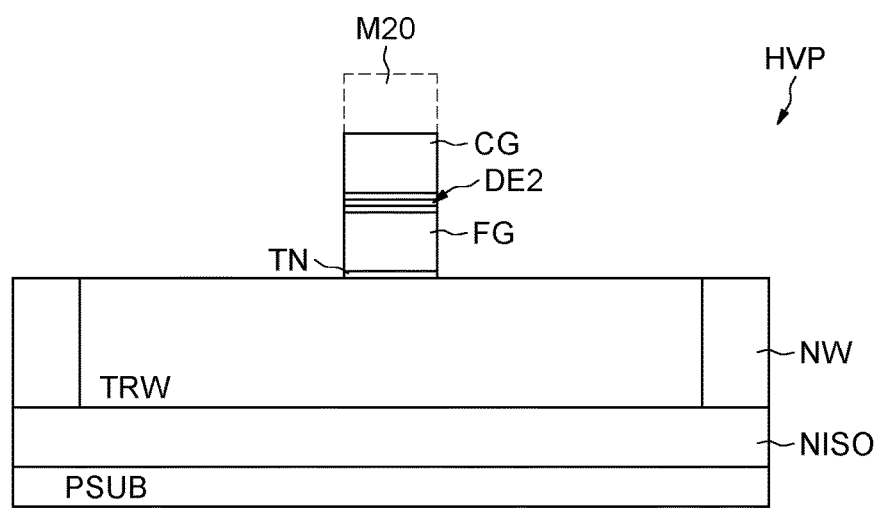

FIG. 6C shows the result of another operation of etching the layers P2, DE2, P1 and TN, stacked on top of the substrate in the second domain HVP of the structure described above with reference to FIG. 5C.

This other etching operation is, for example, carried out using a plasma-based dry etching technique.

Another mask M20 has been formed by lithography so as to cover and to protect the portion of said stacked layers that will form a second gate region CG/FG of said at least one second transistor in the portion C.

During this etching operation, the mask M20 covers and protects the entire surface of the structures of the portions A and B described above with reference to FIGS. 6A and 6B.

This other etching operation could also have been carried out before etching the conductive material P2 of the structures of the portions A and B of the first domain LVP.

The masks M2 and M20 are removed from all parts after the respective etching operations.

Figure 7A:
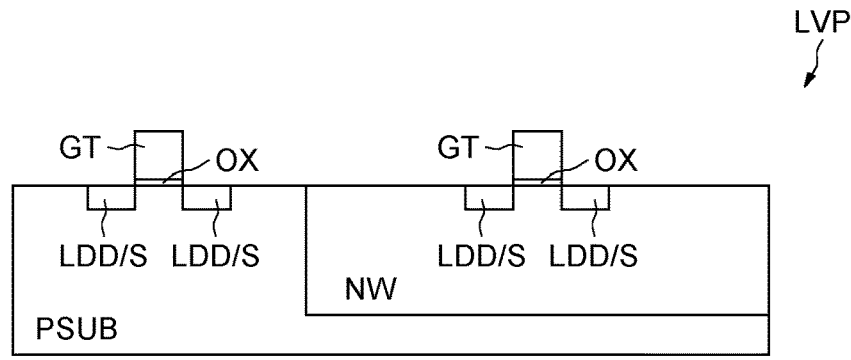
Figure 7B:
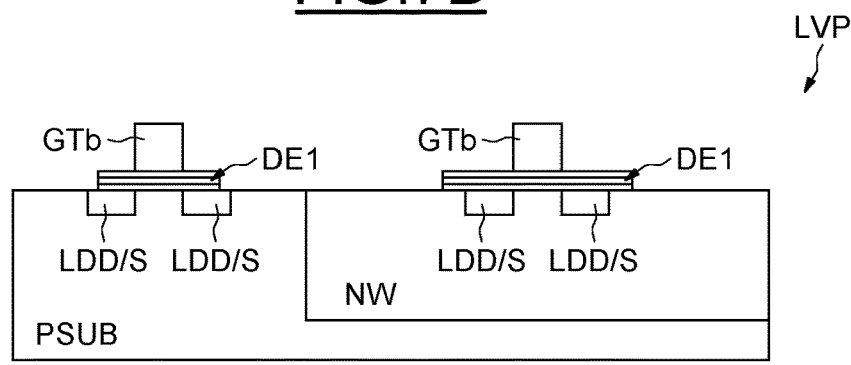
Figure 7C:
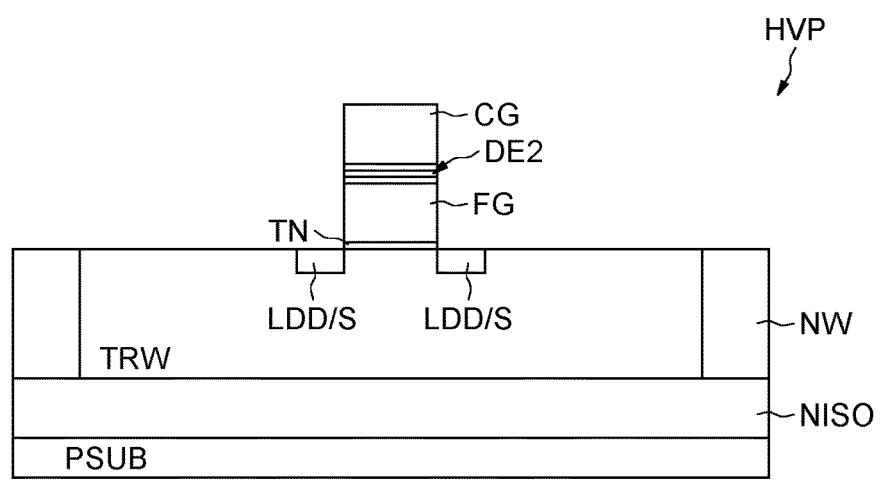

FIGS. 7A, 7B and 7C show the result of forming lightly doped source and drain regions LDD/S on the structures described above with reference to FIGS. 6A, 6B and 6C.

The lightly doped drain and source regions LDD/S are conventional and known per se. The formation of lightly doped drain and source regions LDD/S makes it possible in particular for the transistor to withstand higher drain-source voltages.

The formation of the lightly doped drain and source regions LDD/S comprises an operation of implanting dopants into the substrate PSUB or the corresponding well NW, TRW on either side of the site at which the corresponding gate region GT, GTb, CG/FG is located.

Said gate regions GT, GTb and CG/FG act as a mask during this implantation operation.

Typically, this implantation operation passes at least partially through the portions of the first gate dielectric layer DE1 that laterally overrun each side of the first gate region GTb.

Figure 8A:
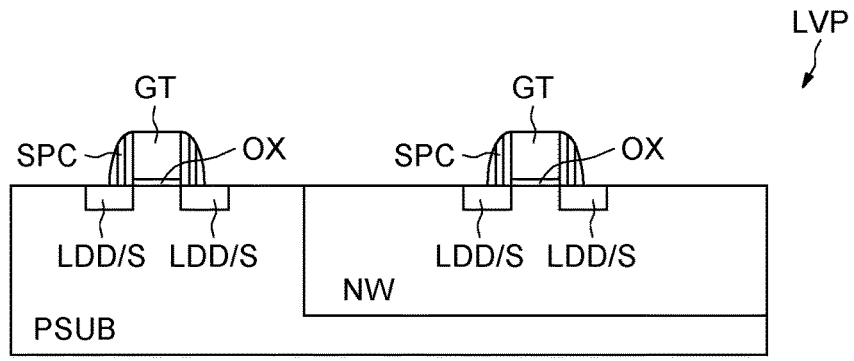
Figure 8B:
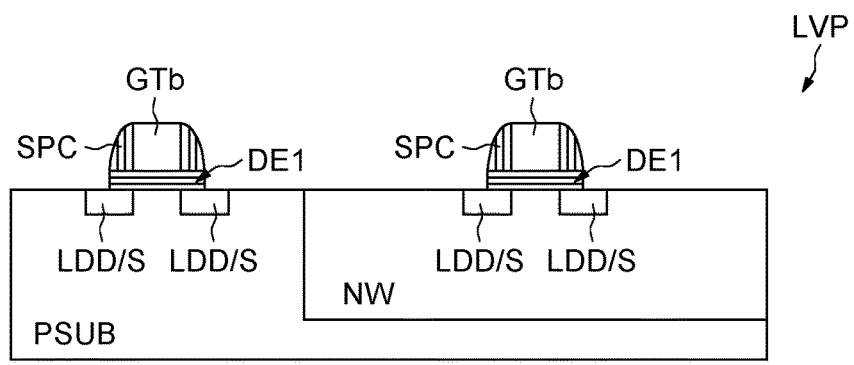
Figure 8C:
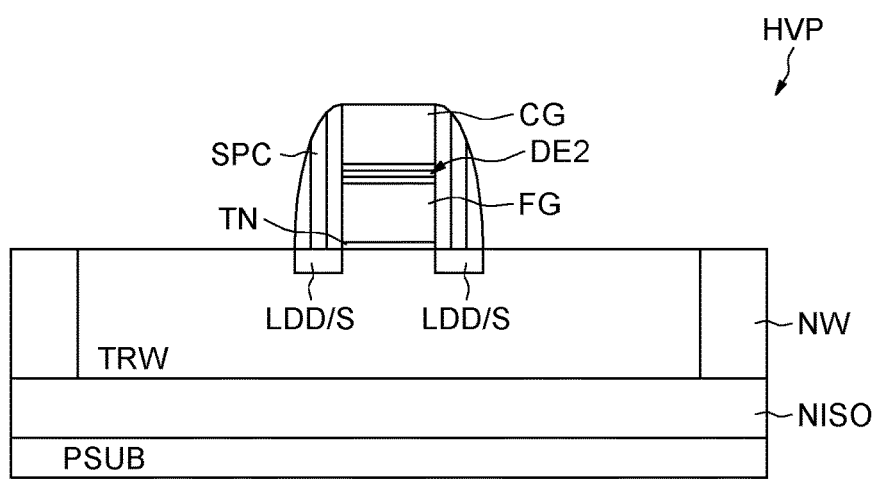

FIGS. 8A, 8B and 8C show the result of an operation of forming gate spacer regions SPC on the flanks of said first, second and third gate regions GTb, CG/FG and GT.

The operation of forming the gate spacers SPC is implemented in a common manner in the portions A, B and C, and comprises an operation of isotropically depositing a dielectric spacer material and an operation of anisotropically etching the dielectric spacer material.

The isotropic deposition operation forms regions in the vicinity of walls, such as the lateral walls of the gate regions, that are thicker (strictly speaking in the vertical direction) than on the horizontal surfaces.

The anisotropic etching operation is stopped once the thickness deposited on the horizontal surfaces has been completely removed, resulting in the presence of remainders of said thicker regions of dielectric spacer material located on the flanks of said gate regions.

The anisotropic etching operation is configured also to remove the portion of the first gate dielectric region DE1 that laterally overruns each side of the first gate region GTb (in other words, the portion that is covered neither by a spacer SPC nor by the first gate region GTb.

Anisotropic etching operations are generally not very selective, but the dielectric spacer material may, for example, be of the same, or similar, nature to that of the first gate dielectric region DE1 so that they exhibit similar behavior during their etching operations.

In other words, the fabrication of said at least one first transistor comprises an operation of forming gate spacers SPC on the flanks of said first gate region GTb. The operation of forming gate spacers SPC comprises an operation of isotropic depositing and an operation of anisotropically etching a spacer dielectric material, and said anisotropic etching operation is configured also to remove the portion of the first gate dielectric region DE1 covered neither by a spacer SPC nor by the first gate region GTb.

Thus, the first gate dielectric region is formed such that it is self-aligned with the gate spacers SPC.

Figure 9A:
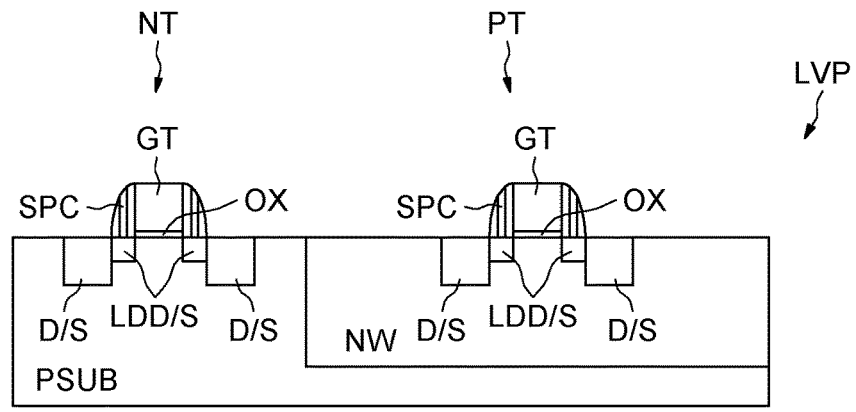
Figure 9B:
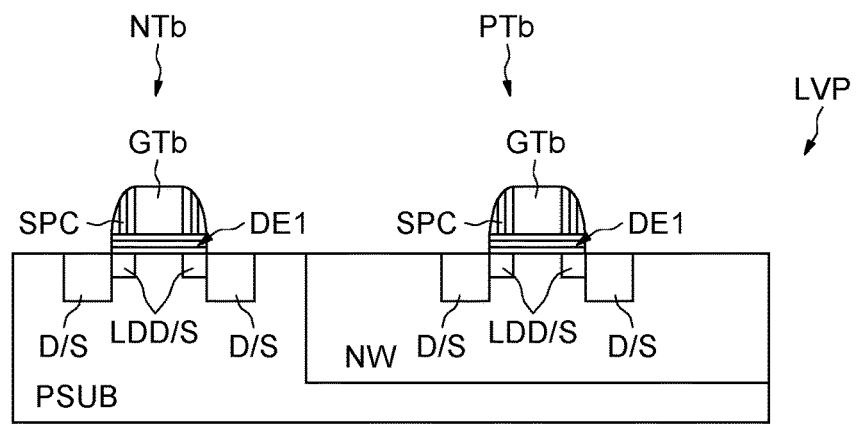
Figure 9C:
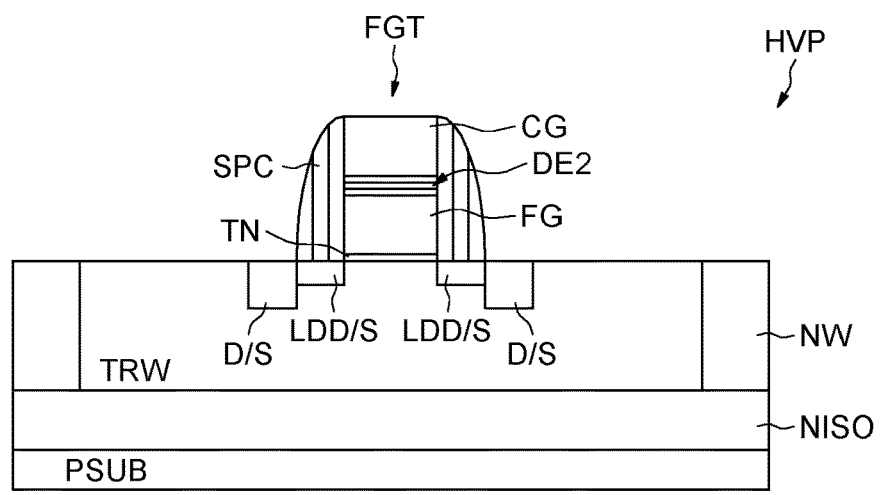

FIGS. 9A, 9B and 9C show the result of forming source and drain regions D/S on the structures described above with reference to FIGS. 8A, 8B and 8C.

The formation of the drain and source regions D/S comprises an operation of implanting dopants into the substrate PSUB or the corresponding well NW, TRW on either side of the site at which the corresponding gate region GT, GTb, CG/FG and the gate spacers SPC on its flanks are located.

Said gate GT, GTb, CG/FG and gate spacer SPC regions act as a mask during this implantation operation.

Thus, transistors that are always off and that cannot be detected by microscopy have been fabricated so as to be advantageously compatible with the usual processes for fabricating integrated circuits, including in this example CMOS transistors in a first domain LVP and floating-gate transistors in a second domain HVP.

The first transistors NTb and PTb, which are always off for any biasing of the first gate region GTb at a value that is lower than or equal to the first supply voltage LVdd, thus form decoy elements against reverse engineering.

This makes it possible, for example, to assemble at least one operational third transistor PT, NT of the first domain LVP together with said at least one first transistor PTb, NTb in an assembly that is configured to implement one logic function, but arranged according to an arrangement that would correspond to another logic function if all of the transistors of this assembly were operational third transistors PT, NT.

For example, it is possible to envisage an arrangement corresponding to a conventional and identifiable three-input NAND ("NAND 3") gate, when in fact the transistors are assembled together to implement a two-input NAND ("NAND 2") function in actuality (in this case by means in particular of another transistor configured to be on regardless of the signal applied to the gate).

Figure 10:
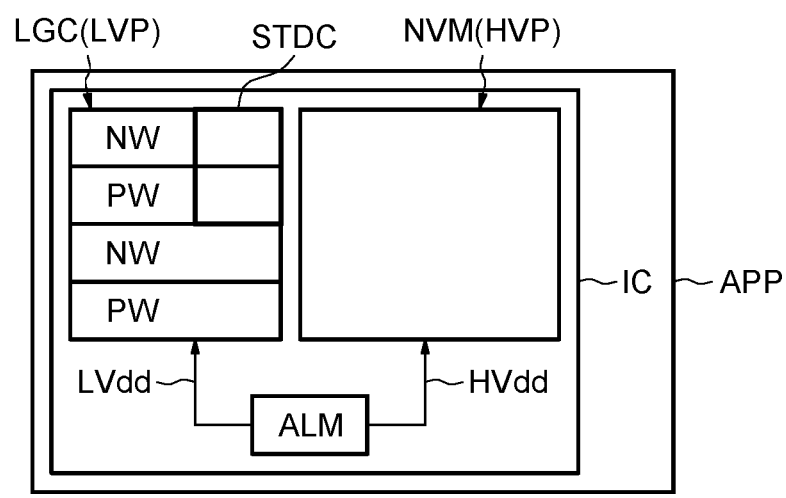
FIG. 10 shows one exemplary embodiment.

FIG. 10 shows an exemplary integrated circuit IC including first transistors PTb and NTb, for example obtained via the process described above with reference to FIGS. 1A-1C to 9A-9C.

An electronic device APP, such as a personal computer or a television decoder, includes the integrated circuit IC. Any other known device not mentioned here may of course be provided with the integrated circuit IC.

The integrated circuit IC includes a first domain LVP, in this example a logic domain LGC, a second domain HVP, in this example a memory plane for a non-volatile memory NVM, and a power supply stage ALM distributing a first supply voltage LVdd to the first domain and a second voltage HVdd, higher than the first supply voltage LVdd, to the second domain HVP.

For example, the second voltage HVdd may be generated by a charge pump, for example supplied with power by the first supply voltage LVdd.

In this example, the logic portion LGC is structured by means of assemblies of standard cells STDC, using CMOS logic technology.

CMOS logic technology is intended to operate at a first supply voltage LVdd of the order of 1.2 volts, or comprised between 1.0 and 2.0 volts.

Typically, a standard cell is designed in particular according to a standardized size and intercompatibility, and is intended to implement a logic function such as a logic gate.

The logic portion LGC comprises an alternation of n-type NW and p-type PW wells, so as to form the complementary CMOS elements in each standard cell.

The portion A, described above with reference to the exemplary fabrication process, may correspond to one portion of a standard cell STDC including a pair of operational transistors and the portion B may correspond to another portion of the same standard cell STDC including a pair of off transistors.

The portion C, described above with reference to the exemplary fabrication process, may in turn correspond to a portion of the EEPROM or flash memory memory plane NVM.

Thus, the integrated circuit IC may have been obtained by implementing the process described above with reference to FIGS. 1A-1C to 9A-9C.

However, the process for fabricating and integrating the first transistors PTb, NTb that are configured to be off for any biasing of their first gate regions GTb at a value that is lower than or equal to the first supply voltage can be applied to any type of integrated circuit including a first domain supplied with power by the first supply voltage and a second domain receiving or generating a second voltage that is higher than the first supply voltage.

Moreover, any type of region, for example, dedicated to forming an element belonging to the second domain but adapted so that the first transistor is off for any biasing of its gate at a value that is lower than or equal to the first supply voltage may be used, insofar as is possible, to form the first gate dielectric region.

The invention claimed is:

1. A process for fabricating an integrated circuit, comprising:

fabricating, in a logic circuit domain which is supplied with power by a first supply voltage, at least one first transistor of a logic circuit, wherein fabricating comprises forming a first gate dielectric region and forming a first gate region on said first gate dielectric region; and fabricating, in a memory circuit domain, at least one second transistor of a memory cell, wherein fabricating comprises forming a floating gate region, forming a second gate dielectric region on the floating gate region, and forming a second gate region on said second gate dielectric region which is configured to be biased at a voltage that is higher than the first supply voltage;

wherein forming the first gate dielectric region is performed simultaneous with forming the second gate dielectric region; and wherein forming the first and second gate dielectric regions produces said at least one first transistor that is turned off for any biasing of said first gate region at a value that is lower than or equal to the first supply voltage.

2. The process according to claim 1, wherein the first supply voltage is between 1.0 and 2.0 volts, and wherein forming the first and second gate dielectric regions comprises forming such that the thickness of said first and second gate dielectric regions is greater than 4 nm.

3. The process according to claim 2, wherein the thickness of said second gate dielectric region is at least equal to 10 nm.

4. The process according to claim 1, wherein forming the first and second gate dielectric regions comprises forming a stack of an oxide layer, a nitride layer and an oxide layer.

5. The process according to claim 1, wherein fabricating said at least one first transistor comprises forming gate spacers on flanks of said first gate region by isotropic depositing a spacer dielectric material and anisotropically etching said spacer dielectric material, wherein said anisotropic etching is configured also to remove a portion of the first gate dielectric region that is not covered by the gate spacer and is not covered by the first gate region.

6. A process, comprising:

depositing a tunnel dielectric layer on a first portion of a semiconductor substrate;

depositing a first conductive layer over the tunnel dielectric layer in the first portion;

depositing a gate dielectric stack of layers over the first conductive layer in the first portion and on a second portion of a semiconductor substrate;

patterning a first mask layer over the gate dielectric stack of layers to cover the first portion and to define a first gate area in the second portion;

removing portions of the gate dielectric stack of layers not covered by the first mask layer;

removing the first mask layer;

depositing a second conductive layer over the gate dielectric stack of layers in the first portion and over unremoved portions of the gate dielectric stack of layers at the first gate area;

patterning a second mask layer over the second conductive layer to define a second gate area in the first portion and define a third gate area corresponding to the first gate area in the second portion;

removing portions of the second conductive layer not covered by the second mask layer;

removing the second mask layer; and implanting dopant into the semiconductor substrate to provide source and drain regions adjacent the second and third gate areas to form a floating gate transistor at the first portion and a first field effect transistor at the second portion, where said first field effect transistor is non-operational in a turned off condition due to presence of the unremoved portions of the gate dielectric stack of layers at the first gate area.

7. The process of claim 6, further comprising:

after removing the first mask layer and before depositing the second conductive layer; forming a gate oxide layer on a third portion of the semiconductor substrate;

wherein depositing the second conductive layer is made over the gate oxide layer in the third portion;

wherein patterning the second mask layer defines a fourth gate area in the third portion; and wherein implanting dopant provides source and drain regions adjacent the fourth gate area to form a second field effect transistor at the third portion, where said second field effect transistor is operational to be controlled in both the turned off condition and a turned on condition.

8. The process of claim 7, wherein the first portion of the semiconductor substrate is defined by a first well region, the second portion of the semiconductor substrate is defined by a second well region and the third portion of the semiconductor substrate is defined by a third well region.

9. The process of claim 7, wherein the second and third well regions are formed by a common well.

10. The process of claim 7, wherein said first field effect transistor is non-operational in the turned off condition for any biasing of a gate of the first field effect transistor at a value that is lower than or equal to a first supply voltage.

11. The process of claim 10, wherein a gate of the floating gate transistor is configured to be biased at a voltage that is higher than the first supply voltage.

12. The process of claim 10, wherein the first supply voltage is between 1.0 and 2.0 volts, and wherein a thickness of the gate dielectric stack of layers is greater than 4 nm.

13. The process of claim 12, wherein the thickness of said gate dielectric stack of layers is at least equal to 10 nm.

* * * * *